UNITED STATES PATENT OFFICE.

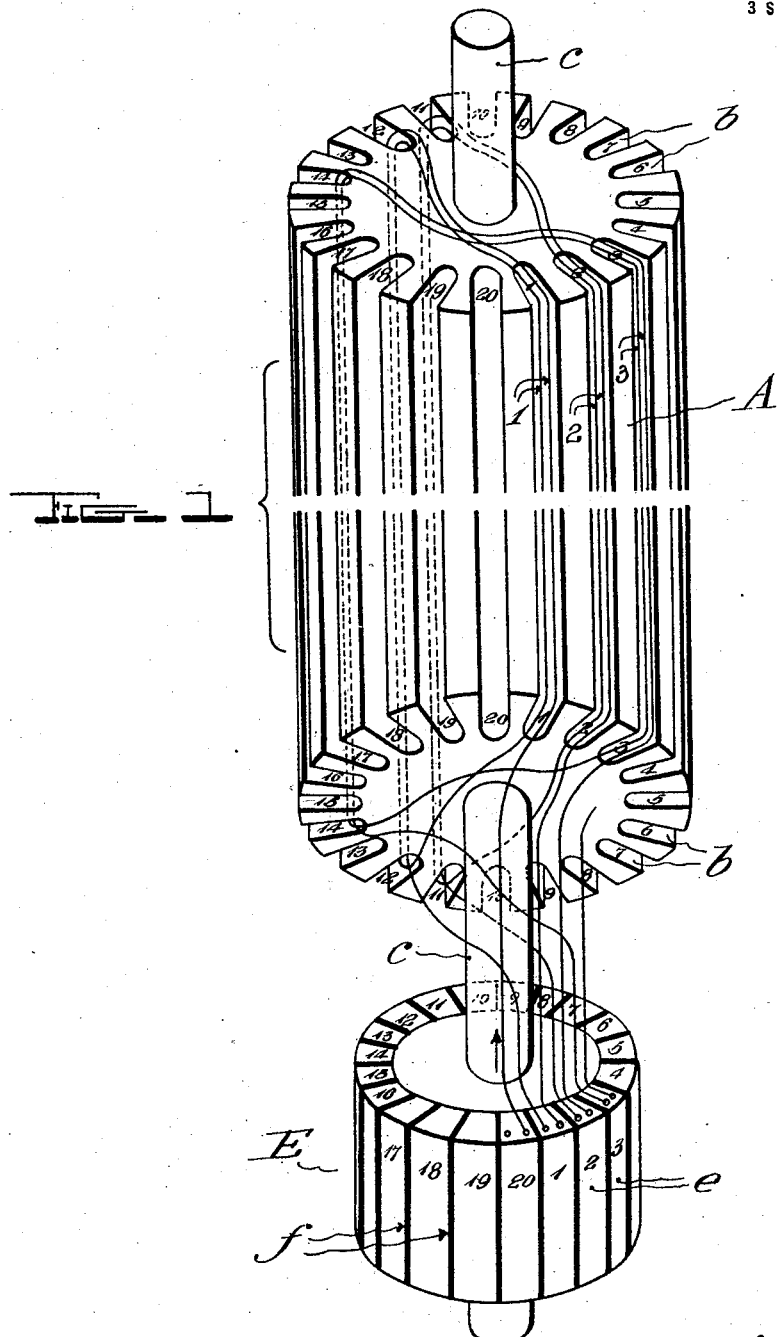

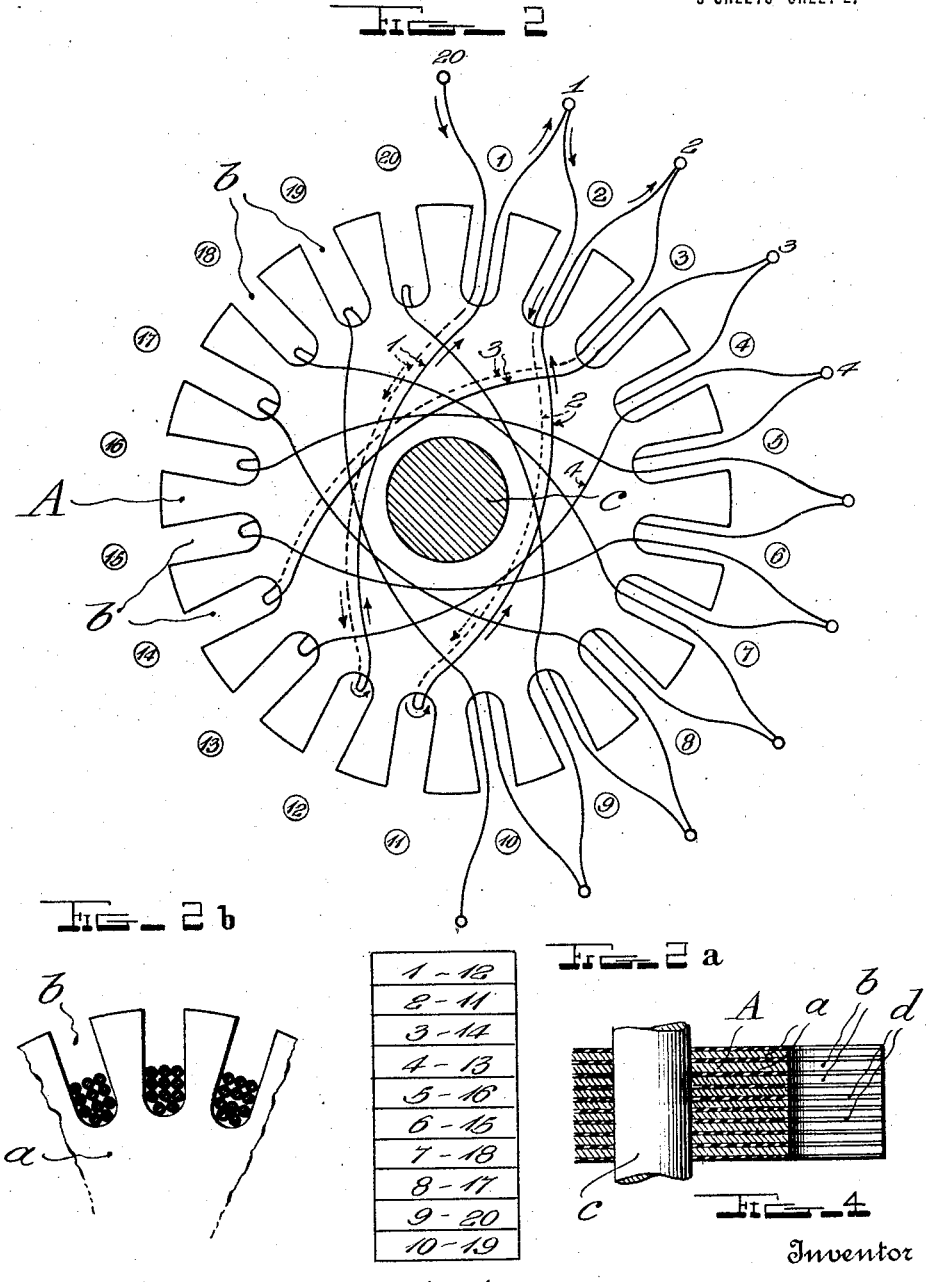

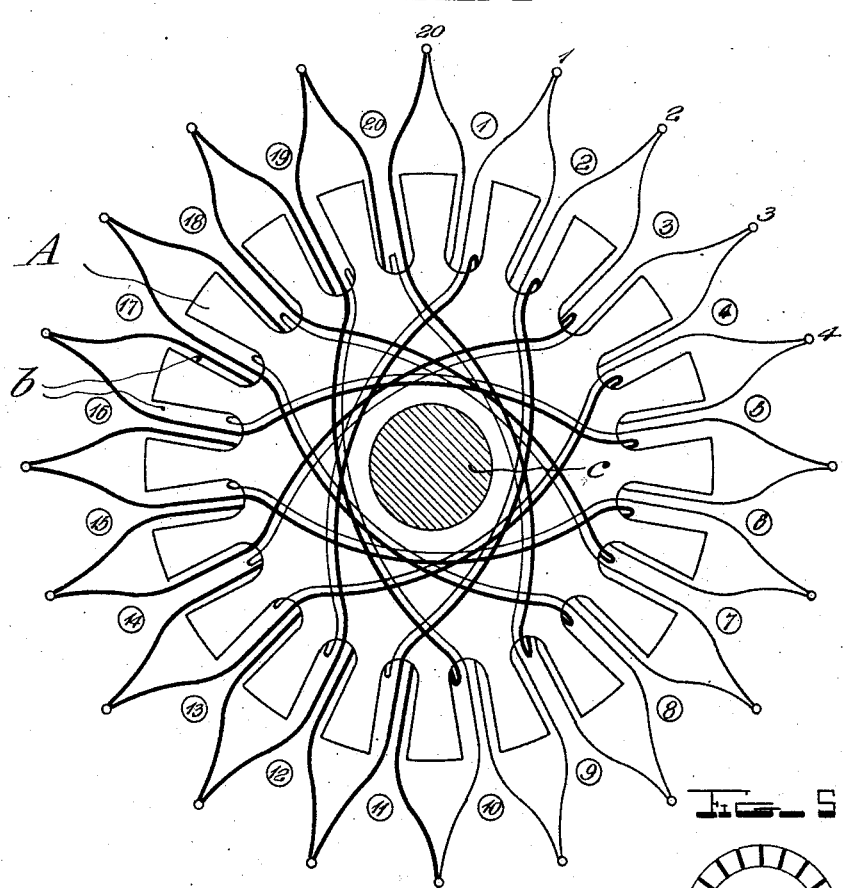
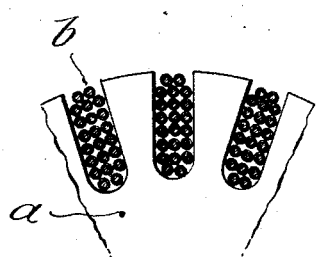

ALFRED W. HOUCHIN, OF KIRKWOOD, NEW JERSEY, ASSIGNOR TO SHOCKLESS ELECTRIC CORPORATION, OF KIRKWOOD, NEW JERSEY, A CORPORATION OF NEW JERSEY.

ARMATURE WINDING.

1,415,875.   Specification of Letters Patent.   Patented May 16, 1922.

Application filed April 30, 1917. Serial No. 165,589.

*To all whom it may concern:*

Be it known that I, ALFRED W. HOUCHIN, a citizen of the United States, residing at Kirkwood, in the county of Camden and State of New Jersey, have invented certain new and useful Improvements in Armature Windings; and I do declare the following to be a full, clear, and exact description of the invention, such as will enable others skilled in the art to which it appertains to make and use the same.

This invention relates to certain new and useful improvements in armature windings therefor for electric generators and motors.

The object of the invention is to provide an armature which is comparatively simple in construction, one which can be made economically, and one which at the same time will be efficient and reliable in operation, thus being a general improvement upon the various types of armatures heretofore known and used.

Because of the fact that the armature may be made very cheaply and because of its efficiency and reliability when in operation, it is especially adapted for use in connection with generators for farm and other isolated power plants.

The invention resides in a novel and unique arrangement of parts, it briefly stated consisting of a plurality of coils wound or arranged upon a core in a novel and unique manner and connected to the segments of a commutator in a novel and unique manner.

The invention also resides in certain details of construction and the combination and arrangement of parts hereinafter fully described and claimed.

In the accompanying drawings forming a part of the application and in which similar reference characters designate like parts throughout the several views:

Figure 1 is a diagrammatic perspective view of the slotted armature core, commutator, and shaft on which said core and commutator are mounted, and showing a trio of coils of the first series of windings, illustrating more particularly the gap between one of the sides of the second and third coils;

Fig. 2 is a diagrammatic view illustrating the complete first series of armature windings or coils;

Fig. 2$^a$ is a chart containing the numbers of the slots in the armature core in which the coils or windings of the first series are disposed;

Fig. 2$^b$ is a transverse sectional view of a portion of the armature core, showing also in section the wires constituting the windings or coils of the first series in position in the slots thereof;

Fig. 3 is a diagrammatic view illustrating the first and second series of armature windings or coils;

Fig. 3$^a$ is a chart containing the numbers of the slots in the armature core in which the coils or windings of the second series are disposed;

Fig. 3$^b$ is a view similar to Fig. 2$^b$ showing the coils of the second series superimposed on the coils of the first series;

Fig. 4 is a fragmentary longitudinal sectional view of a portion of the armature core illustrating how it is preferably made up of a plurality of flat plates;

Fig. 5 is an end view of the commutator and conventional brushes, showing the comparative width of the latter with respect to the bars or segments of the commutator.

In the drawings, wherein the preferred form of the invention is illustrated, the letter A denotes as a whole the armature core, which is in the form of a cylindrical drum and preferably made up of a plurality of flat sheet iron plates $a$, each of which is provided at its periphery with a series of circumferentially spaced notches. These plates $a$ are mounted upon the shaft $c$ in any suitable manner and are insulated from each other by a suitable insulating varnish or shellac $d$. The notches are suitably alined so as to form slots $b$ which extend either longitudinally or diagonally of the core as is desired. In the present instance, the slots extend longitudinally of the core.

Although the number of slots in the completed armature core is not necessarily essential, yet this number, in order to produce the new results hereinafter described, must be an even number, that is, a number which is a multiple of two. Where $n$ is any integer the number of slots will be $4(n+1)$. In the present instance, twenty slots are shown, and these slots are numbered in succession from 1 to 20, the value of $n$ being 4.

Mounted in any suitable manner upon the shaft $c$ is a collecting commutator E having at its periphery a plurality of segments or bars $e$ of conducting material, said segments or bars $e$ being suitably insulated from each other in the usual manner by strips of insulating material $f$. The number of segments or bars *e* in the commutator must be equal to the number of armature slots or 4 (*n*+1) in order to produce the desired results.

The winding for the core consists of 4 (*n*+1) coils arranged in two series of 2 (*n*+1) coils each, the first series only partially, or as illustrated half filling the slots as clearly shown in Fig. 2$^b$ of the drawings, while the second series of windings added to the first series completely fill the slots as clearly shown in Fig. 3$^b$. It will be seen that the induction portions of the coils of one series are superimposed on the corresponding induction portions of another series. By the term "induction portions" is meant the portions of the coil which extend longitudinally of the core and which cut across the lines of force of the magnetic field or fields.

Fig. 2 illustrates the manner in which the various coils of the first series of windings are carried around the core A and connected to the various segments *e* of the commutator E. From this it may be seen that coil number 1 is connected at one end to commutator segment number 20 and is then wound endwise or longitudinally around the core A any desired number of times, being disposed in slots numbers 1 and 12, the portions of said coil which pass around the ends of the core being disposed on the same side of the core axis or shaft *c*. The other end of the coil 1 which adjoins segment numbered 20 is then connected to commutator segment number 1.

A lead is taken from commutator segment number 1 to one end of coil number 2. This coil number 2 is wound around the core A and disposed in slots 2 and 11, the portions of said coil which pass around the ends of the core being disposed on the opposite side of the shaft *c*. The other end of the coil number 2 is connected to commutator segment number 2.

Coil number 3 is connected at one end to commutator segment number 2 and is wound around the core, being disposed in slots 3 and 14, the portions which pass around the end of said core being disposed substantially on the same side of the shaft *c* as the similar portions of coil number 1 are disposed. The other end of coil number 3 is connected to commutator segment number 3. It is to be here noted that one of the sides of the coils 1, 2 and 3 are disposed in adjacent armature slots, namely, slots 1, 2 and 3, whereas the other sides of these coils 1, 2 and 3 are disposed respectively in slots 12, 11 and 14, slot number 13 being left open for the time being.

Slot number 13 is, however, filled, or in fact partially filled, when coil number 4 is wound, said coil being disposed in this slot and slot number 4 and having its portions which pass around the ends of the core disposed on the side of the shaft *c* opposite that on which the similar portions of coil number 3 are disposed. The remaining coils of the first series are wound around the core in the same manner as coils 1, 2, 3 and 4 are wound.

In Fig. 3 of the drawings, the core A of the armature is shown diagrammatically wound with both the first and second series of windings, the first series being shown in light lines while the second series are shown in heavy lines. The second series is wound in exactly the same manner as the first series with the exception that the ends of the windings or coils are connected to the commutator segments 10 to 20. By these connections, it will be seen that a continuous winding for the armature is formed, and in this connection it will be stated that this continuous winding may be made of a plurality of strips of wire, or a single length of wire as is the most desirable.

It will be observed that in the bi-polar winding which has been taken to illustrate one mode of practicing the invention, the drum-like core is surrounded by two circular series of coils with the induction portions of the coils of one series superimposed on those of the other series and with all of the coil terminals of one series terminating on one side of a diametrical line which passes through the midpoints of commutator segments 20 and 10, all of the coil terminals of the other series being disposed on the other side of such diameter. The coil terminals at the extremities of the two series of coils are connected to these two diametrically opposed commutator segments 20 and 10 while all the remaining coil terminals of one series are connected to the segments on one side of said opposed pair and all the remaining coil terminals of the other series are connected to the segments on the other side of said pair of segments. It is also to be noted that the two terminals of each coil are connected to adjoining commutator segments and the contiguous coil terminals of each two coils which are next to each other around the core are connected to the same segment of the commutator. For example the adjoining coils numbered 1 and 2 have their contiguous extremities connected to segment numbered 1 while the two adjoining coils, numbered 2 and 3 have their contiguous terminals connected to segment numbered 2. In addition to the arrangement of the coils in arcuate series or groups, the coils are also symmetrically arranged in pairs, the coils numbered 1 and 2 constituting, for example, one pair, the coils numbered 3 and 4 constituting another pair, etc. The coils of each pair, it will be noted, have their corresponding or adjacent induction portions located in slots or other coil receiving seats that are adjoining; so that they are separated by magnetic bodies and in a bi-polar winding the induction portions of one coil of each pair will be in slots or seats diametrically opposite those receiving the induction portions of the other coil of such pair. This arrangement places the coils of each pair on opposite sides of and next to a diameter of the core, the end portions of the two coils of each pair, that is, those portions of the winding at the ends of the core, being passed on correspondingly opposite sides of the core axis or shaft. While these end portions of the coils of each pair do not cross each other it will be seen on referring to Figs. 2 and 3, that the end portions of the adjacent or adjoining coils of two adjacent or adjoining pairs of coils, do cross each other and also pass on opposite sides of the axis of the core. With respect to the adjoining coils of adjoining pairs, for example the adjoining coils numbered 2 and 3 of the adjoining pairs numbered 1, 2 and 3, 4, it will be noted that their induction portions on one side or place on the core will be in adjoining slots while their induction portions on the other side of the core will be spaced from each other by the two slots (12, 13) which contain the corresponding induction portions of the other two coils (1, 4) of such adjoining pairs of coils. This winding in a bi-polar machine also places the two induction portions of each coil in core slots or seats that are removed from each other around the core by intervals of one-half and two less than one-half of the total number of slots or seats. It also places the end portions of each successive coil on opposite sides of the axis or shaft of the core or, in other words, each alternate coil has its end portions passing in the same direction around the axis while the intervening coils have their end portions passing to the opposite side of the core axis.

In Fig. 5 of the drawings, the relative thickness of the brushes which are used in connection with this device to the width of the commutator segments or bars is shown, and from this it will be seen that the brushes are slightly less in thickness than one segment $e$ and can at the most engage only two segments. In other types of machines, the brushes are usually thick enough to engage three commutator segments at the same time.

In making an armature ordinary double cotton covered wire is used and it is not necessary to use any other water-proofing or impregnating insulation or varnish on the wire or wires from which the coils of the armature are made.

The above described arrangement of coils produces an armature which is evenly balanced, both electrically and mechanically, one which will produce an even current with minimum sparking, and one which will be efficient and reliable in operation.

It will be understood that dynamo electric machines containing this armature may be used either as generators or motors.

From the foregoing description, taken in connection with the accompanying drawings, the construction and use of the invention will be readily understood without a more extended explanation.

As numerous changes in form, proportion, and in the minor details of construction may be resorted to without departing from the spirit of this invention, I do not wish to be limited to the construction herein shown and described.

I claim:—

1. In combination; an armature having a plurality of slots, and a plurality of coils disposed in said slots, said coils being symmetrically arranged in pairs, the coils of each pair being disposed in slots on opposite sides of and next to a line drawn through the axis of the armature and extending across the ends of the armature on correspondingly opposite sides of said axis; and a commutator having as many segments as there are coils; the two terminals of each of said coils being connected to adjoining commutator segments, the contiguous terminals of the coils of each pair being connected to the same commutator segment, and the contiguous terminals of the adjoining coils of the adjoining pairs being connected to the same commutator segment.

2. In combination; an armature having 4 $(n+1)$ slots, and a winding thereon composed of 4 $(n+1)$ coils arranged in two series of 2 $(n+1)$ coils each, where $n$ is any integer, the coils of one series being disposed in all of said slots, the coils of the other series being also disposed in all of said slots and being superimposed upon the coils of the first series, the coils of each series being symmetrically arranged in pairs, the coils of each pair being disposed in slots on opposite sides of and next to a line drawn through the axis of the armature and extending across the ends of the armature on correspondingly opposite sides of said axis; and a commutator having 4 $(n+1)$ segments; the two terminals of each of said coils being connected to adjoining commutator segments, the contiguous terminals of the coils of each pair being connected to the same commutator segment, and the contiguous terminals of the adjoining coils of adjoining pairs being connected to the same commutator segment.

In testimony whereof I have hereunto set my hand in the presence of two subscribing witnesses.

ALFRED W. HOUCHIN.

Witnesses:
 ALFRED W. HOUCHIN, Jr.,
 J. M. BIRCKS.